(12) United States Patent  
Haynes et al.

(10) Patent No.: US 9,083,667 B2
(45) Date of Patent: Jul. 14, 2015

(54) SYSTEM AND METHOD FOR FOLLOW-ON MESSAGE PROCESSING

(75) Inventors: Thomas R. Haynes, Apex, NC (US); Michael R. O'Brien, Westford, MA (US); William G. Stoddard, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1922 days.

(21) Appl. No.: 12/015,360

(22) Filed: Jan. 16, 2008

(65) Prior Publication Data

US 2009/0182824 A1 Jul. 16, 2009

(51) Int. Cl.
*G06F 15/16* (2006.01)
*H04L 12/58* (2006.01)
*H04L 29/06* (2006.01)

(52) U.S. Cl.
CPC .............. *H04L 51/18* (2013.01); *H04L 51/16* (2013.01); *H04L 51/046* (2013.01); *H04L 63/10* (2013.01)

(58) Field of Classification Search
USPC .................. 709/203–207; 719/318, 328–330; 715/752, 753
See application file for complete search history.

(56) References Cited

U.S. PATENT DOCUMENTS

| | | | |
|---|---|---|---|
| 6,711,608 B1 * | 3/2004 | Ogilvie ........................... | 709/206 |
| 6,959,337 B2 * | 10/2005 | McLaughlin et al. ........ | 709/229 |
| 7,054,927 B2 * | 5/2006 | Ulrich et al. .................. | 709/223 |
| 7,113,977 B1 * | 9/2006 | Baker et al. .................... | 709/206 |
| 7,117,246 B2 * | 10/2006 | Christenson et al. ......... | 709/206 |
| 7,133,891 B1 * | 11/2006 | Uceda-Sosa et al. ......... | 709/203 |
| 7,155,681 B2 * | 12/2006 | Mansour et al. .............. | 715/762 |
| 7,233,977 B2 * | 6/2007 | Gupta et al. ................... | 709/216 |
| 7,356,730 B2 * | 4/2008 | Ulrich et al. .................... | 714/6 |
| 7,392,484 B1 * | 6/2008 | Garfinkel et al. .............. | 715/751 |
| 7,437,407 B2 * | 10/2008 | Vahalia et al. ................. | 709/203 |
| 7,444,374 B1 * | 10/2008 | Baker ............................ | 709/206 |
| 7,464,139 B2 * | 12/2008 | Malik ............................ | 709/206 |
| 7,603,420 B2 * | 10/2009 | Doan et al. .................... | 709/206 |
| 7,603,677 B2 * | 10/2009 | Mukundan et al. ........... | 719/330 |
| 7,698,376 B2 * | 4/2010 | Lin et al. ........................ | 709/217 |
| 7,716,288 B2 * | 5/2010 | Graham et al. ................ | 709/206 |
| 7,720,919 B2 * | 5/2010 | Khouri et al. .................. | 709/206 |
| 7,792,911 B2 * | 9/2010 | Wilson .......................... | 709/206 |
| 7,805,423 B1 * | 9/2010 | Romine et al. ................ | 707/704 |
| 7,822,820 B2 * | 10/2010 | LeVasseur et al. ............ | 709/206 |
| 7,849,262 B1 * | 12/2010 | Glade et al. ................... | 711/114 |
| 7,870,260 B2 * | 1/2011 | McIsaac et al. ............... | 709/227 |
| 2004/0117451 A1 * | 6/2004 | Chung .......................... | 709/207 |
| 2006/0041718 A1 * | 2/2006 | Ulrich et al. .................. | 711/114 |

(Continued)

*Primary Examiner* — Melvin H Pollack
(74) *Attorney, Agent, or Firm* — Jeffrey T. Holman

(57) ABSTRACT

A follow-on message processing system for an integrated information management application. The follow-on message processing system includes a client computer coupled to a network, an email client coupled to the client computer, and a follow-on message controller coupled to the email client. The email client receives an email and a follow-on command from another email client. The follow-on command is associated with the email received from the other email client. The follow-on message controller interrupts access to the email client in response to a determination that an email draft is in progress. The email draft in progress is associated with the received email.

25 Claims, 9 Drawing Sheets

(56) References Cited

U.S. PATENT DOCUMENTS

| | | | |
|---|---|---|---|
| 2007/0005717 A1* | 1/2007 | LeVasseur et al. | 709/206 |
| 2007/0038711 A1* | 2/2007 | MacBeth et al. | 709/206 |
| 2008/0046518 A1* | 2/2008 | Tonnison et al. | 709/206 |
| 2008/0082604 A1* | 4/2008 | Mansour et al. | 709/203 |
| 2008/0201438 A1* | 8/2008 | Mandre | 709/206 |
| 2008/0256182 A1* | 10/2008 | Sekaran et al. | 709/204 |
| 2009/0037541 A1* | 2/2009 | Wilson | 709/206 |
| 2009/0113001 A1* | 4/2009 | Manning et al. | 709/206 |
| 2009/0172109 A1* | 7/2009 | Weir et al. | 709/206 |
| 2009/0187831 A1* | 7/2009 | Tiwana et al. | 715/752 |
| 2009/0248806 A1* | 10/2009 | Teman | 709/206 |

* cited by examiner

SYSTEM AND METHOD FOR FOLLOW-ON MESSAGE PROCESSING

BACKGROUND OF THE INVENTION

Oftentimes, an email user sends out an email, for example, to ask a question or ask for help solving a problem. However, as is often the case, the email sender user may send out an additional email, as a follow-on to the original email, in which the sender tells the recipient to ignore the original email. This may be, for example, because the sender has already found the answer, in the meantime, and no longer needs the recipient to reply with the answer to the question. Unfortunately, the recipient of the original email may still end up spending considerable time and effort in researching and finding an answer to the question because the recipient is unaware that the problem has been resolved. This unnecessary work can be costly in time, productivity, and money, because an employee may waste time solving a problem that is already solved.

Currently, the only existing solution to this problem is the recall function found in email clients, such as Lotus Notes. Under the current solution, after sending the original email, the sender may attempt to recall the email using the recall function. However, this solution merely attempts to delete the email received in the recipient's email client without any notification as to why it was deleted. In order to explain why the email was recalled, an additional email would be sent containing an explanation. Currently, recalling an email doesn't notify the recipient that the content of the original email may no longer be relevant, or that the email contained erroneous information in the email body or in the attachments. Currently, when one of the above situations occurs, the sender of the original email may send another email in addition to the recall request in order to convey one or more of the messages above.

Sending additional email tends to clutter and fill up the inbox in the recipient's email client. Many email users come back to hundreds of emails after a business trip or vacation. Many times, the recipient starts from the oldest email and reviews the emails in the inbox from oldest to newest. Sometimes a question has already been solved, and the sender of the email makes it known at a later time, perhaps a later day, that the question is resolved. This may result in the recipient wasting time and energy researching a problem that has already been resolved, simply because the later notification is residing further up the email inbox queue. Sending additional emails to provide correct information, attach a different attachment, or instruct the recipient to ignore a previous email adds to the clutter of an email client inbox. Additionally, the recipient may be in the middle of a reply or forward of the received email and not see the later email in time to prevent replying to or forwarding on erroneous information from the original email, replying to irrelevant information, or wasting time answering a question that has been resolved. Thus, the current solution to recall an email provides a limited functionality because it does not address many possible scenarios.

SUMMARY OF THE INVENTION

Embodiments of a system are described. In one embodiment, the system is a follow-on message processing system. An embodiment of the follow-on message processing system includes a client computer coupled to a network, an email client coupled to the client computer, and a follow-on message controller coupled to the email client. The email client receives an email and a follow-on command from another email client. The follow-on command is associated with the received email. The follow-on message controller interrupts access to the email client in response to a determination that an email draft is in progress. The email draft in progress is associated with the received email.

In some embodiments, the follow-on message controller includes a notification engine to display a visual notification on a display device to announce the interrupted access to the email client. In some embodiments, the notification engine includes an IM interface to display an instant message on the display device. In this case, the visual notification is the instant message. In some embodiments, the notification engine includes a network interface to display a follow-on notification within a header of the received email. In some embodiments, the follow-on message controller includes a command engine to execute a follow-on command in response to a determination that a follow-on function is enabled in the email client. In some embodiments, the command engine modifies a segment of a received email in response to the follow-on command, which includes a modify command. In some embodiments, the command engine modifies the email draft in progress in response to the follow-on command. In some embodiments, the command engine deletes the received email in response to the follow-on command, which includes a delete command. In some embodiments, the follow-on message processing system includes an evaluation engine to determine whether a follow-on function is enabled in the email client, to determine a read status of the received email, and to determine whether the email draft is in progress. Other embodiments of the system are also described.

Embodiments of a method are also described. In one embodiment, the method is a method for implementing a follow-on message. An embodiment of the method includes receiving a follow-on command associated with an email received at the email client and determining whether an email draft is in progress. The email draft in progress is associated with the received email. The method also includes interrupting access to the email client associated with the email draft in progress in response to receiving the follow-on command. Other embodiments of the method are also described.

Embodiments of an apparatus are also described. In one embodiment, the apparatus is a computer program product which includes a computer useable storage medium to store a computer readable program that, when executed on a computer, causes the computer to perform operations. In one embodiment, the operations include an operation receive a follow-on command associated with an email received at an email client. The operations also include an operation to determine whether an email draft is in progress. The email draft in progress is associated with the received email. The operations also include an operation to interrupt access to the email client associated with the email draft in progress in response to the follow-on command.

Embodiments of another apparatus are also described. The apparatus includes means for receiving an email and means for receiving a follow-on command associated with the received email. The follow-on command includes an instruction to modify the received email. The apparatus also includes means for determining whether an email draft associated with the received email is in progress. The email draft incorporates content of the received email. The apparatus also includes means for at least temporarily preventing completion of the email draft during execution of the instruction to modify the received email during which the content of the received email within the email draft is modified. Other embodiments of the apparatus are also described.

Other aspects of embodiments of the system, method, and apparatus will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate processing follow-on messages in an integrated information management application. An exemplary integrated information management system includes Lotus Notes®. This and other integrated information management systems incorporate multiple workspaces (e.g., an email workspace, a calendar workspace, a task workspace, etc.) into a single software application that may be stored and executed on a computer system. Alternatively, some embodiments facilitate processing follow-on messages in a standalone application such as an email system.

Figure 1:
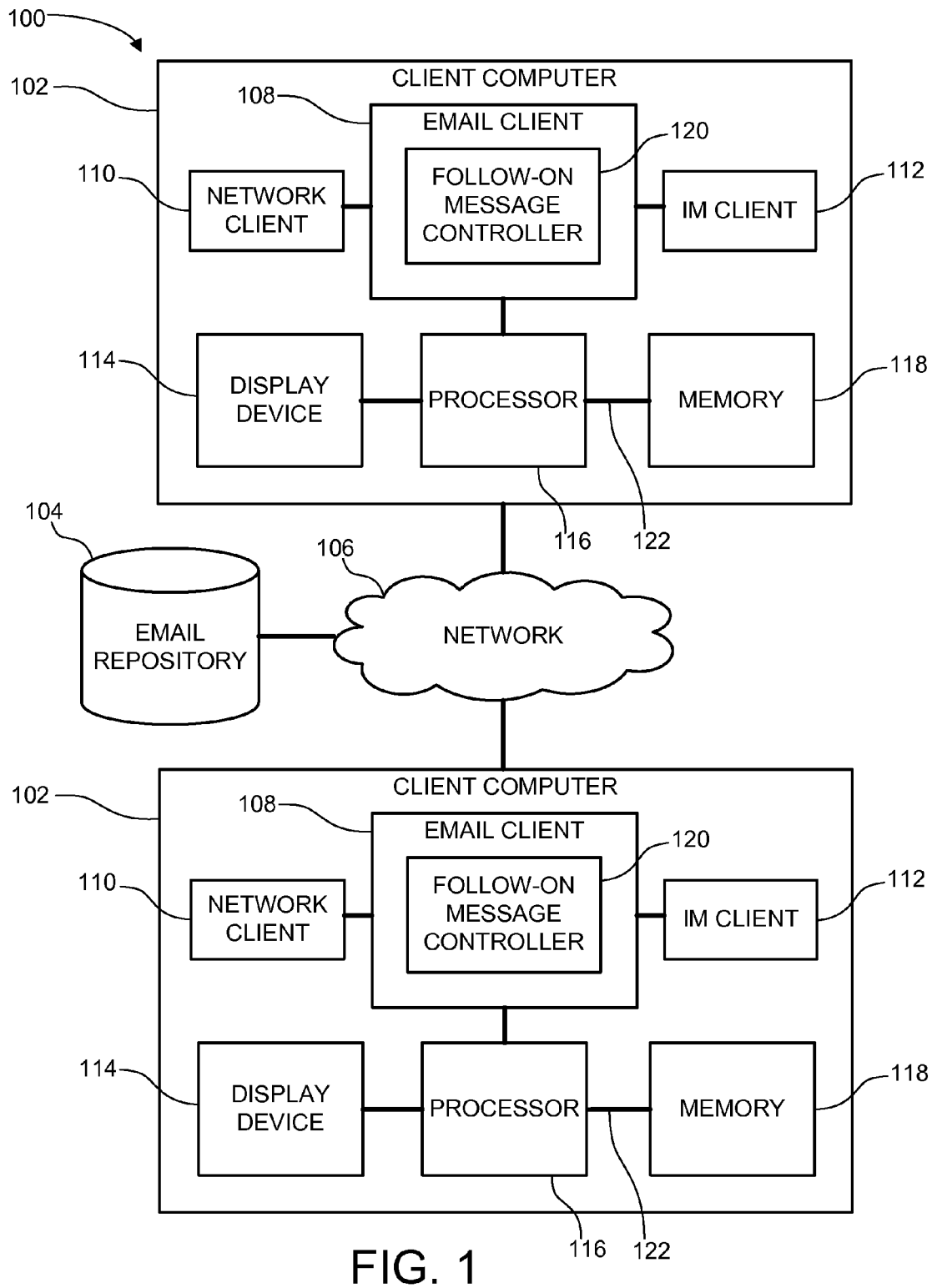
FIG. 1 depicts a schematic block diagram of one embodiment of a computer network system.

FIG. 1 depicts a schematic block diagram of one embodiment of a computer network system 100. The illustrated computer network system 100 includes a client computer 102, a network 106, and an email repository 104. Although the depicted computer network system 100 is shown and described herein with certain components and functionality, other embodiments of the computer network system 100 may be implemented with fewer or more components or with less or more functionality. For example, some embodiments of the computer network system 100 may include more than two client computers 102, a plurality of email repositories 104, and/or a plurality of networks 106. Additionally, some embodiments of the integrated information management system 100 may include similar components arranged in another manner to provide similar functionality, in one or more aspects.

The depicted client computer 102 includes an email client 108, a network client 110, an IM client 112, a display device 114, a processor 116, an electronic memory device 118, and one or more bus interfaces 122 to facilitate email communications, including sending and receiving email messages. In one embodiment, the client computer 102 is a desktop or laptop computer. In other embodiments, the client computer is a personal digital assistant, a cellular phone device, or any other type of mobile computing device that allows a user to read, write, receive, and send emails.

Although the depicted client computer 102 includes the email client 108, the network client 110, and the IM client 112, other embodiments of the client computer 102 may include fewer or more clients. Additionally, at least some of the resources of each client may be shared among multiple clients. For example, some embodiments of the client computer 102 store email messages and related messages and data on a single data repository (e.g., email repository 104). As another example, the email messages and related messages and data of the client computer 102 may be stored on more than one data repository. Other configurations also may be implemented.

The email repository 104 stores emails, and facilitates exchanging emails among a plurality of client computers 102 across the network 106. The network 106 may be an intranet, the internet, a local area network (LAN), a wide area network (WAN), a cellular network, or another type of network, or a combination or different types of networks. In one embodiment, the email repository 104 facilitates local replication. In some embodiments, the email repository 104 includes a local electronic memory device or a data storage device within a computer system. In one embodiment, the email repository 104 includes an electronic memory device or a data storage device within an email server.

The depicted email client 108 includes a follow-on message controller 120. Details of the follow-on message controller 120 are discussed in further detail below in relation to FIG. 2. In some embodiments, the email client 108 accesses the plurality of emails stored in the email repository 104. In particular, the email client 108 may include a graphical interface to display email messages on the display device 114, a composer to allow a user to draft email messages and follow-on messages, and a storage controller to store at least some of the email messages in the email repository 104. Also, the email client 108 is coupled to a network client 110 to access the email repository 104 over the network 106 and to an IM client 112 to send and to receive instant messages associated with a follow-on message. In one embodiment, the email client 108 receives a follow-on command associated with a received email. Follow-on messages and the process of receiving and executing a follow-on command are discussed in more detail below.

In some embodiments, the display device 114 is a graphical display such as a cathode ray tube (CRT) monitor, a liquid crystal display (LCD) monitor, or another type of display device. In one embodiment, the display device 114 is configured to convey a visual representation of a follow-on notification, a follow-on message, or a follow-on message interface. Additionally, the display device 114 may be configured to display other follow-on functions that are discussed below in further detail.

In one embodiment, the processor 116 is a central processing unit (CPU). In other embodiments, the processor 116 is a graphical processing unit (GPU) or another type of processing device such as a general purpose processor, an application specific processor, a multi-core processor, or a microprocessor. Alternatively, a separate GPU may be coupled to the display device 114. In general, the processor 116 executes one or more instructions to provide operational functionality to the computer network system 100. The instructions may be stored locally in the processor 116 or in the electronic memory device 118. Alternatively, the instructions may be distributed across one or more devices such as the processor 116, the electronic memory device 118, or another data storage device.

In some embodiments, the electronic memory device 118 is a random access memory (RAM) or another type of dynamic storage device. In other embodiments, the electronic memory device 118 is a read-only memory (ROM) or another type of static storage device. In other embodiments, the illustrated memory device 118 is representative of both RAM and static storage memory within a single computer network system 100. In other embodiments, the electronic memory device 118 is an electronically programmable read-only memory (EPROM) or another type of storage device. Additionally, some embodiments store the instructions as firmware such as embedded foundation code, basic input/output system (BIOS) code, or other similar code.

In one embodiment, the email client 108, the display device 114, the processor 116, the electronic memory device 118, and other components within the computer network system 100 may be coupled to one or more bus interfaces 122. The bus interfaces 122 may be configured for simplex or duplex communications of data, address, and/or control information.

Figure 2:
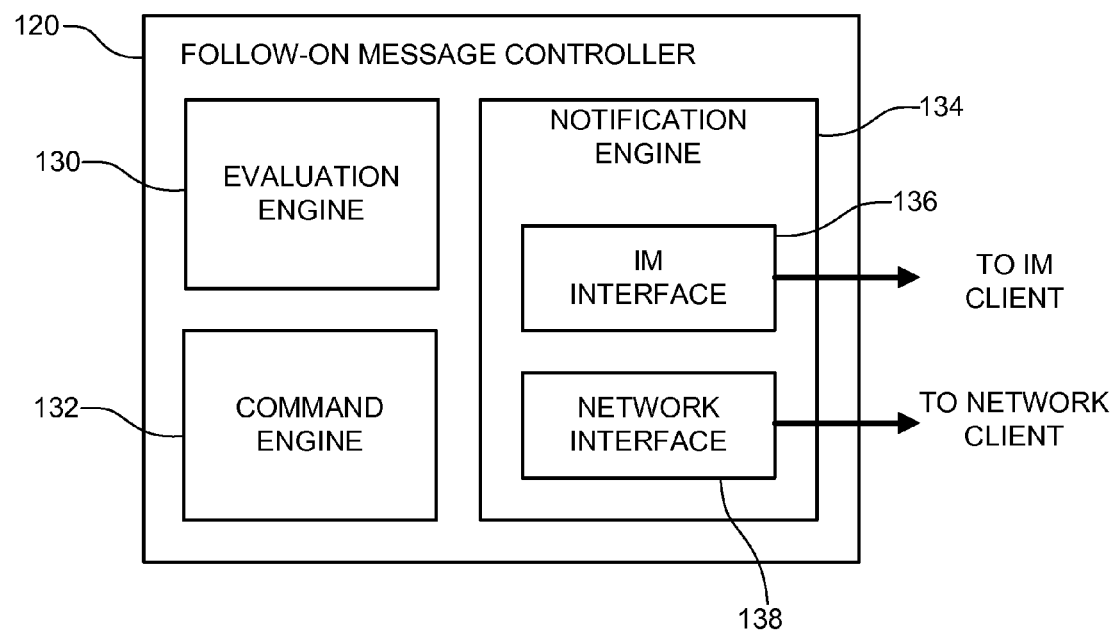
FIG. 2 depicts a schematic block diagram of one embodiment of a follow-on message controller.

FIG. 2 depicts a schematic block diagram of one embodiment of a follow-on message controller 120. The follow-on message controller 120 includes an evaluation engine 130, a command engine 132, and a notification engine 134. Although the follow-on message controller 120 is shown coupled to the email client 108 in FIG. 1, other embodiments of the computer network system 100 of FIG. 1 may implement the follow-on message controller 120 coupled to the email repository 104 or coupled to an email server attached to the network 106. In some embodiments, the follow-on message controller 120 is stored in an electronic memory device or a data storage device within a client computer 102. In the same embodiment, the follow-on message controller 120 includes processes and functions which are executed on a processor 116 within a client computer 102. Alternatively, the follow-on message controller 120 may be implemented independently of the various components of the computer network system 100.

In one embodiment, the follow-on message controller 120 is configured to send a follow-on command to one or more email clients 108. In a further embodiment, the follow-on message controller 120 is configured to select one or more follow-on commands from a set of follow-on commands. In other embodiments, a user selects one or more follow-on commands from the set of follow-on commands.

One exemplary follow-on command is a modify command. Some other exemplary follow-on commands are an ignore command and a delete command, among other possible follow-on commands. After selecting the follow-on command, the follow-on message controller 120 may then initiate a follow-on message procedure. For example, after a user composes and sends an email to a recipient, the user may decide to change or add information contained in the body of the email, or may decide the content of the email is no longer relevant and can be ignored or deleted. In one embodiment, the user selects and initiates the appropriate follow-on command, and the follow-on message controller 120 then executes instructions to send the follow-on command. Parts of the follow-on modify procedure and other follow-on message procedures may be initiated in this or other manners, as described below. A more detailed description of follow-on message procedures is discussed in relation to FIG. 9 and FIG. 10 below. In one embodiment, the follow-on message controller 120 sends a follow-on command to another follow-on message controller 120, and the other follow-on message controller 120 executes the received follow-on command.

In one embodiment, the evaluation engine 130 evaluates the read status of an email received in an email client 108. For example, the read status of a received email in the email client 108 may be presently open, meaning the presently open email is currently open by a user (e.g., for review, replying, or forwarding, etc.). Other exemplary read statuses of the received email may be unopened, or previously opened. Thus, in some embodiments, the evaluation engine 130 is configured to determine whether an email draft is in progress, and more specifically, to determine whether a received email with an associated follow-on command is presently open for review, replying, or forwarding. In other embodiments, the evaluation engine 130 is configured to determine whether a follow-on function is enabled in the email client 108. For example, after a user composes and sends an email to a recipient, the user may decide to change or add information contained in the body of the email, or may decide the content of the email is no longer relevant and can be ignored or deleted. However, it should be noted that execution of the follow-on command at the recipient's email client 108 may depend on whether or not the follow-on functionality is enabled at the recipient's email client 108. If the follow-on function is enabled in the recipient's email client 108, then the follow-on message controller 120 coupled to the recipient's email client 108 executes the appropriate follow-on command. However, if the follow-on function is not enabled in the recipient email client 108, then the follow-on message controller 120 coupled to the recipient's email client may ignore the follow-on command.

In one embodiment, the illustrated command engine 132 executes a received follow-on command, and more specifically, the command engine 132 executes the follow-on command in response to a determination that the follow-on function is enabled in the email client 108. In some embodiments, the command engine 132 modifies a received email in the recipient's email client 108 in response to receiving and executing a modify command associated with the received email. In a further embodiment, the command engine 132 modifies a received email that is presently open for review, replying, or forwarding in conjunction with modifying the received email in the recipient's email client 108.

For example, a presently open copy of the received email may be one instance of the received email, and the received email stored in the email repository 104, or stored on the client computer 102, may be another instance of the same email. Thus, the command engine 132 modifies each instance of the received email associated with the modify command. In another embodiment, the command engine 132 deletes a received email in the recipient's email client 108 in response to receiving and executing a delete command associated with the received email.

The illustrated notification engine 134 includes an IM interface 136 and a network interface 138. In one embodiment, the notification engine 134 is configured to notify a recipient of an email that a follow-on procedure is executed in relation to the received email. An exemplary configuration of the notification engine 134 displays a visual notification on a display device 114 in a separate window or a separate viewing space within a graphical-user interface of the client computer 102. More specifically, the notification engine 134 may be configured to display an instant message on a display device 114, via the IM interface 136. For example, the instant message may be shown in a pop-up window. Alternatively, the instant message may be shown in a pane, or tile, of another viewing space such as the email viewing space. In some embodiments, the notification engine 134 is configured to display a notification on the header of the email client or a column of the header, via the network interface 138, indicating to a recipient of an email that a follow-on function has been executed in association with the received email.

In one embodiment, the instant message is a short messaging service (SMS) text message, or some other type of message, that is sent to and displayed on a display device 114 of a cell-phone (not shown), personal digital assistant (PDA, not shown), or some other similar mobile computing device. For example, after a user composes and sends an email to a recipient, the user may decide to change or add information contained in the body of the email, or may decide the content of the email is no longer relevant and can be ignored or deleted. In one embodiment, the user selects and initiates the appropriate follow-on command, and the notification engine 134 then displays a notification of the follow-on procedure on the display device 114 of the recipient's client computer 102. Exemplary notifications include an instant message and a header notification. Additionally, in some embodiments, the notification engine 134 may send a SMS to a mobile computing device of the recipient to notify the recipient of the follow-on message procedure.

Figure 3:
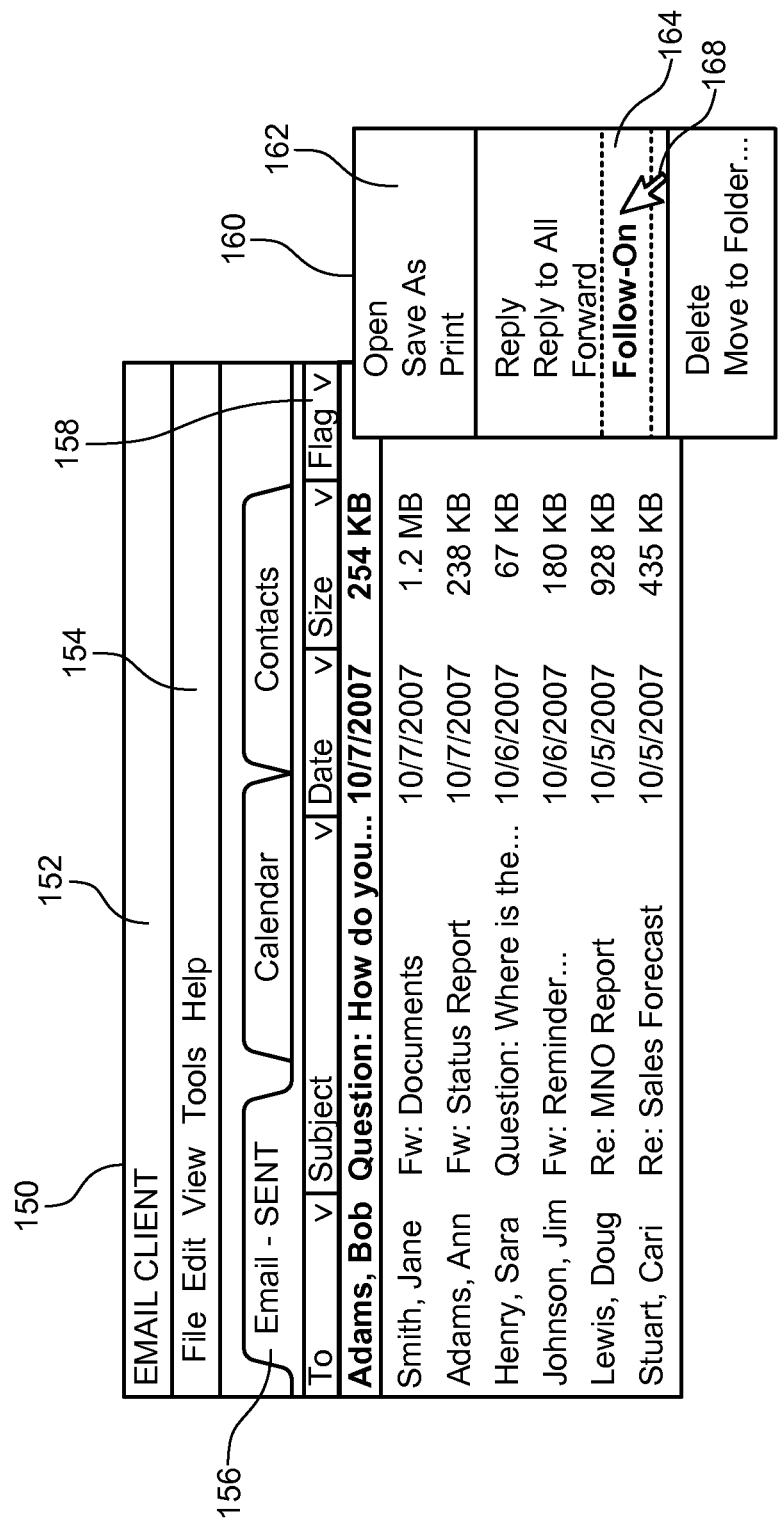
FIG. 3 depicts a schematic block diagram of one embodiment of a follow-on message sender interface for use with the follow-on message controller of FIG. 2.

FIG. 3 depicts a schematic block diagram of an embodiment of a follow-on message sending interface 150 for use with the follow-on message controller 120 of FIG. 2. In particular, the follow-on message sending interface 150 shows the list of sent emails generated by the email client 108 within a graphical user interface (GUI) for display on a display device 114. It should be noted that other embodiments of the follow-on message sending interface 150 may be integrated with existing or new interfaces that are used to display related information.

The illustrated follow-on message sending interface 150 includes a title bar 152 to show a title of the follow-on message sending interface 150, a menu bar 154 to show possible menu selections within the follow-on message sending interface 150, and one or more tabbed viewing spaces 156, including an email viewing space, a calendar viewing space, and contacts viewing space. Other embodiments may include fewer or more tabbed viewing spaces 156. The illustrated follow-on message sending interface 150 also includes column header fields 158, including a to field, a subject field, a date field, a size field, and a flag field. Some embodiments may include fewer or more column header fields 158. The follow-on message sending interface 150 also includes a menu 160, which may be accessed, for example, by right-clicking on a portion of the follow-on message sending interface 150.

The menu 160 includes menu options 162, including a follow-on selection 164, and depicts a cursor 168 positioned to select the follow-on selection 164. Although a menu 160 is shown, other embodiments may use other types of viewing spaces to display the follow-on option 164. For example the follow-on selection 164 may be selected from the menu bar 154. Alternatively, the follow-on selection 164 may be shown in a pane, or tile, of another viewing space.

Figure 4:
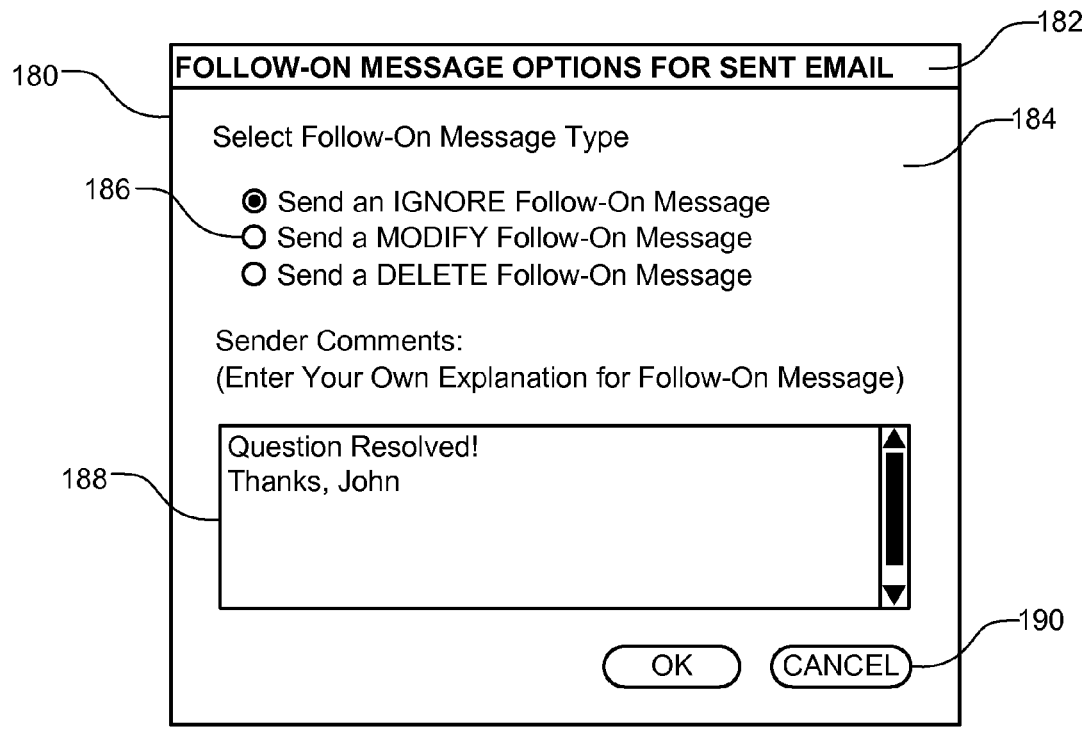
FIG. 4 depicts a schematic block diagram of one embodiment of a follow-on message parameter interface for use with the follow-on message controller of FIG. 2.

FIG. 4 depicts a schematic block diagram of one embodiment of a follow-on message parameter interface 180 for use with the follow-on message controller 120 of FIG. 2. In particular, the illustrated follow-on message parameter interface 180 shows a plurality of list generation parameters that may be used by the follow-on message controller 120 to initiate a follow-on message procedure. Although the illustrated follow-on message parameter interface 180 includes certain parameters, other embodiments may include fewer or more parameters. Additionally, some parameters may be selected, enabled, or disabled by a user. Other parameters may be selected, enabled, or disabled automatically by the follow-on message controller 120. It should also be noted that other embodiments of the follow-on message parameter interface 180 may be integrated with existing or new interfaces for that are used to display related information.

The illustrated follow-on message parameter interface 180 includes a title bar 182 to show a title of the follow-on message parameter interface 180 and a user selection interface 184 to allow a user to select and customize a follow-on message. The user selection interface 184 includes a set of follow-on selection options 186 to allow a user to select a follow-on message procedure, a comment box 188 to allow a user to add user comments to a follow-on message notification, and interface control buttons 190, including an ok button to accept and initiate the selected follow-on procedure, and a cancel button to cancel the follow-on procedure selection and close the follow-on message parameter interface 180. Other embodiments may include fewer or more follow-on selection options 186. Although the follow-on message parameter interface 180 is shown as a separate viewing window, other embodiments may use other types of viewing spaces to display the follow-on message parameter interface 180. For example the follow-on selection options 186 may be selected from a right-click menu 160, as depicted in relation to FIG. 3. Alternatively, the follow-on message parameter interface 180 may be shown in a pane, or tile, of another viewing space.

Figure 5:
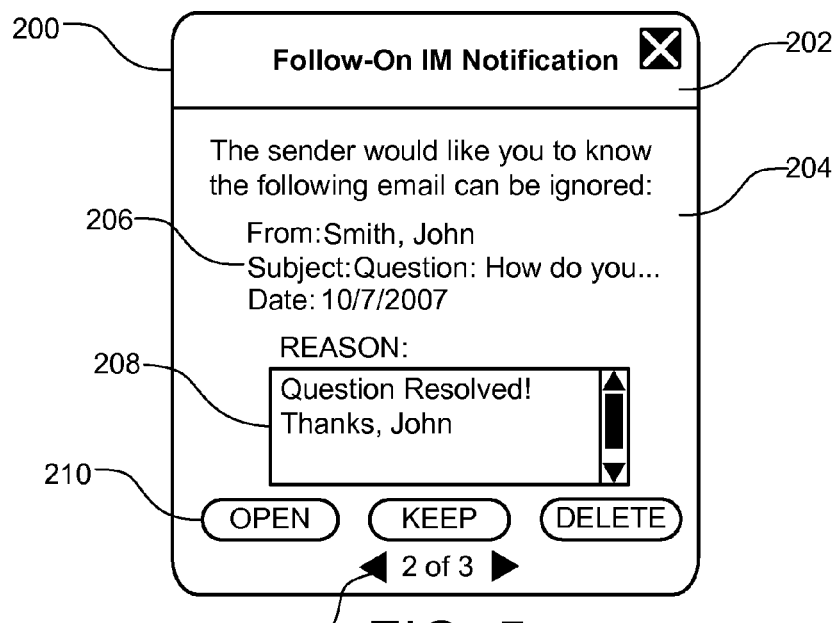
FIG. 5 depicts a schematic block diagram of one embodiment of a follow-on instant message interface for use with the follow-on message controller of FIG. 2.

FIG. 5 depicts a schematic block diagram of one embodiment of a follow-on instant message interface 200 for use with the follow-on message controller 120 of FIG. 2. In particular, the follow-on instant message interface 200 shows the details generated by the notification engine 134 within a graphical user interface (GUI) for display on a display device 114, in order to instantly notify a user of the details of a follow-on message procedure. It should be noted that other embodiments of the follow-on instant message interface 200 may be integrated with existing or new interfaces that are used to display related information.

The illustrated follow-on instant message interface 200 includes a title bar 202 to show a title of the follow-on instant message interface 200, an instant message body 204 to show the details of the instant message, including the received email details 206 to show the details of the received email, including the from field, subject field, and date field. The title bar 202 includes a control interface button to close the instant message notification.

The instant message body 204 also includes a follow-on comment box 208 to show comments from the sender of the original email that may indicate a reason for the follow-on message procedure. The instant message body 204 also includes instant message control interface buttons 210, including an open button to open the email associated with the follow-on message procedure, a keep button to keep the email associated with the follow-on message procedure in the recipient email client 108, and a delete button to delete the email associated with the follow-on message procedure. Although a follow-on instant message interface 200 is shown, other embodiments may use other types of viewing spaces to display the details of a follow-on message procedure. For example the follow-on instant message interface 200 may be a SMS text message, or some other type of instant message, that is sent to and displayed on a display device 114 of a mobile computing device. Alternatively, the follow-on instant message interface 200 may be shown in a pane, or tile, of another viewing space.

Figure 6:
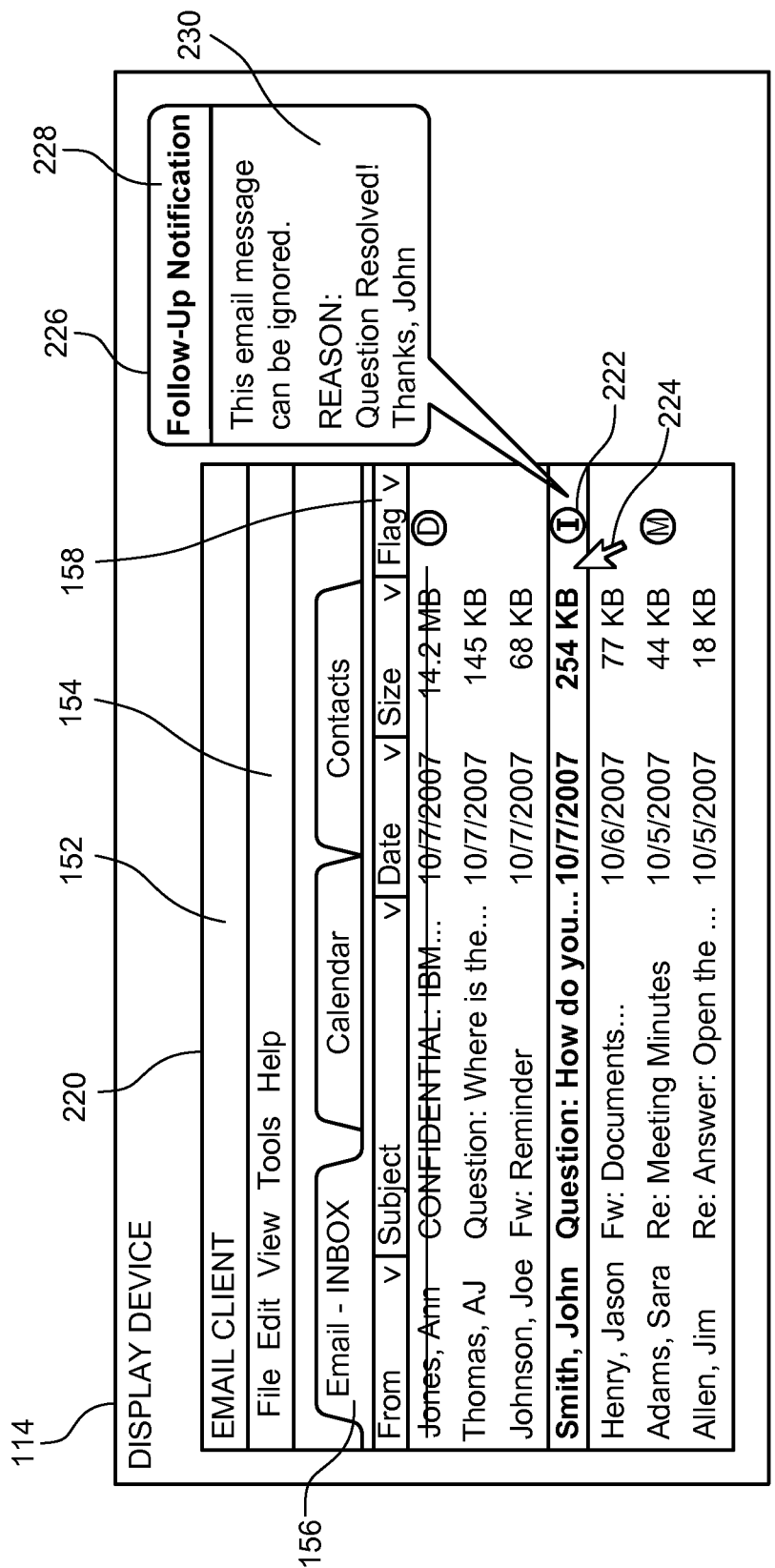
FIG. 6 depicts a schematic block diagram of one embodiment of a follow-on message receiver interface for use with the follow-on message controller of FIG. 2.

FIG. 6 depicts a schematic block diagram of an embodiment of a follow-on message receiving interface 220 for use with the follow-on message controller 120 of FIG. 2. In particular, the follow-on message receiving interface 220 shows the list of sent emails generated by the email client 108 within a graphical user interface (GUI) for display on a display device 114. It should be noted that other embodiments of the follow-on message receiving interface 220 may be integrated with existing or new interfaces that are used to display related information. Additionally, many of the operations of the illustrated follow-on message receiving interface 220 are substantially similar to the follow-on message sending interface 150 of FIG. 5 and, hence, are not described further.

The illustrated column header fields 158 include a to field, a subject field, a date field, a size field, and a flag field. In some embodiments, the flag field includes an active notification flag 222, including an active delete notification flag, an active ignore notification flag, and an active modify notification flag. The active notification flag 222 is a visual notification of a follow-on message procedure contained within the header of a received email in the email client 108.

In one embodiment, the active notification flag 222 is activated by a user, or recipient, rolling a mouse cursor 224 over the active notification flag 222. In some embodiments, when a recipient places the mouse cursor over the active notification flag 222, or the email header with the active notification flag 222, a follow-on pop-up window 226 opens.

The follow-on pop-up window 226 includes a title bar 228 to show a title of the follow-on pop-up window 226, and a follow-on pop-up message body 230 to show the details of the follow-on message procedure, including comments from the sender of the original email that may indicate a reason for the follow-on message procedure. In some embodiments, the active delete notification flag may provides visual feedback in the form of a strikethrough line across a received email indicating that email has been deleted through a follow-on delete procedure. Although a message receiving interface 220 with a follow-on pop-up window 226 is shown, other embodiments may use other types of viewing spaces to display the details of a follow-on message procedure. For example the follow-on pop-up window 226 may be some other type of message sent to and displayed on a display device 114 of a mobile computing device. Alternatively, the follow-on pop-up window 226 may be shown in a pane, or tile, of another viewing space.

Figure 7:
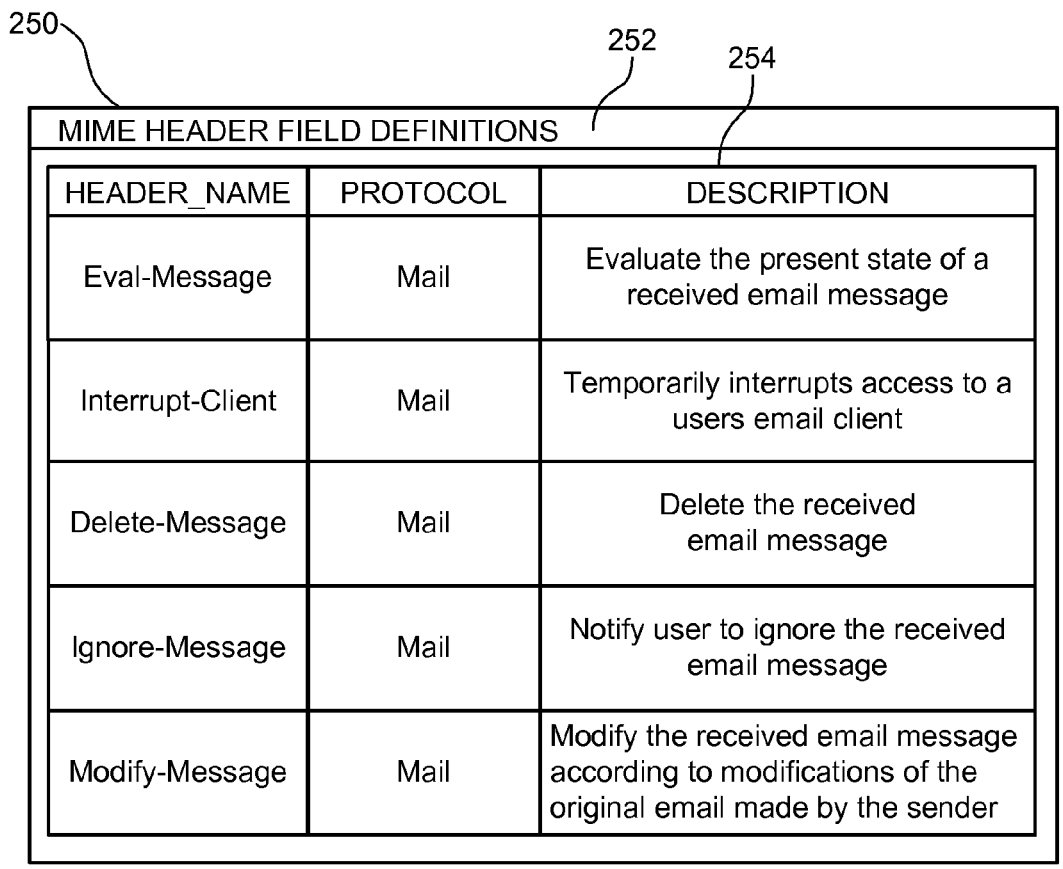
FIG. 7 depicts a schematic block diagram of an embodiment of multipurpose internet mail extensions (MIME) header field definitions.

FIG. 7 depicts a schematic block diagram of an embodiment of multipurpose internet mail extensions (MIME) header field definitions 250 for use with the follow-on message controller 120 of FIG. 2. In particular, the MIME header field definitions 250 shows a list of follow-on function definitions related to certain follow-on message procedures. It should be noted that other embodiments of the MIME header field definitions 250 may be integrated with existing or new MIME definitions that are used to add functionality to a follow-on message procedure.

MIME is a communication standard that extends the format of email to support text ASCII and other character sets, attachments, multi-part message bodies, and header information. Mapping messages into and out of MIME format is typically done automatically by an email client 108 or by mail servers when sending or receiving email. The MIME standard specifies the familiar formats for text email headers and body and rules pertaining to commonly used header fields such as "To:", "Subject:", "From:", and "Date:". MIME is extensible, meaning the MIME standard provides a method of registering new content types, message constructs, and other additional MIME attribute values. Thus, in one embodiment, the follow-on message procedures are registered in the MIME standard and implemented as a set of MIME header field definitions.

The illustrated MIME header field definitions 250 include a title bar 252 to show a title of the MIME header field definitions 250 MIME header field, and a list of MIME header field definitions 254, including eval-message for evaluating the present state of a received email, interrupt-client for temporarily interrupting access to a user's email client 108, delete-message for deleting the received email message, ignore-message for notifying a user to ignore a received email, and modify-message for modifying an original email received in a recipient email client 108 according to modifications made by the sender of the original email. In one embodiment, the depicted MIME header filed definitions 250 are registered as mail protocols. Although, in some embodiments, the MIME header field definitions 250 may be registered as a proprietary protocol, or another type of protocol.

Figure 8:
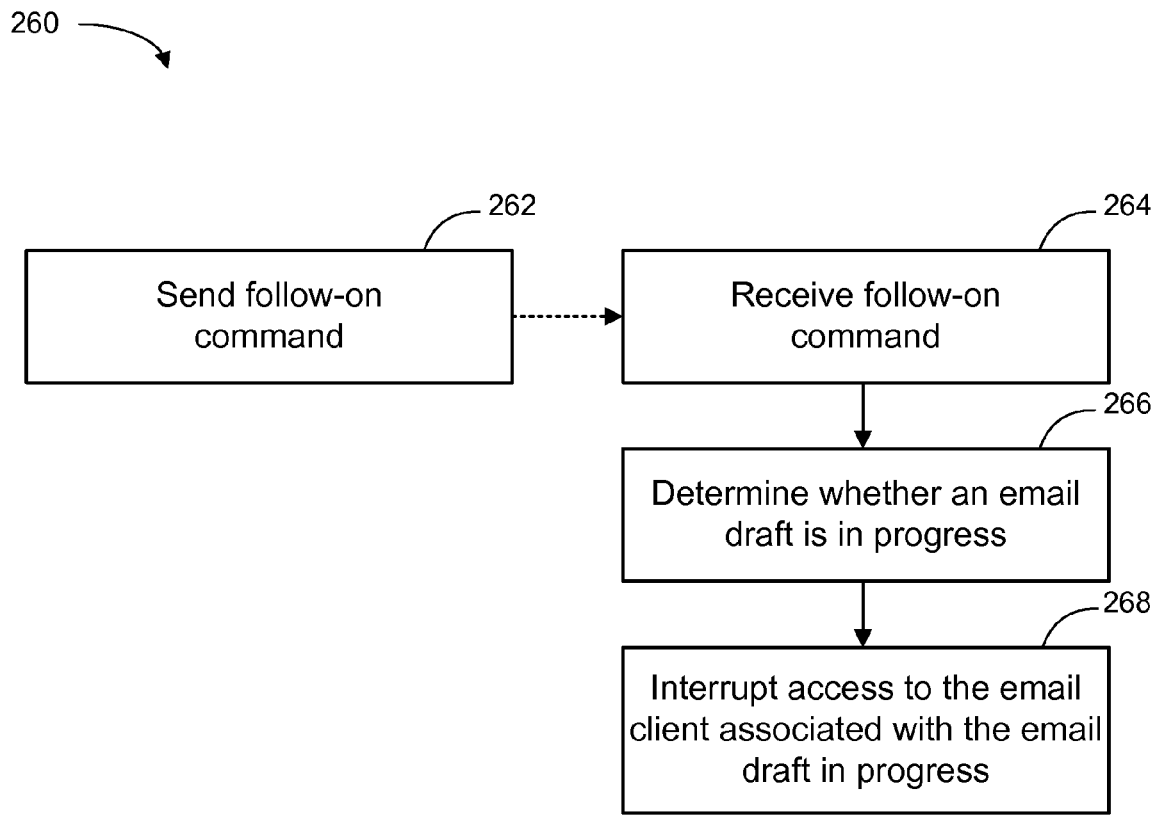
FIG. 8 depicts a schematic flow chart diagram of one embodiment of a general follow-on method for use with the follow-on message controller of FIG. 2.

FIG. 8 depicts a schematic flow chart diagram of one embodiment of a general follow-on method 260 for use with the follow-on message controller 120 of FIG. 2. For ease of explanation, the general follow-on method 260 is described with reference to the follow-on message controller 120 of FIG. 2. However, some embodiments of the general follow-on method 260 may be implemented with other follow-on message controllers. Additionally, the general follow-on method 260 is described in conjunction with the follow-on message interface 150 of FIG. 3 and the similar follow-on message interface 220 of FIG. 6, but some embodiments of the general follow-on method 260 may be implemented with other follow-on message interfaces.

In the illustrated general follow-on method 260, the follow-on message controller 120 sends 262 a follow-on command to a client computer 102. The follow-on command is associated with an email received by the other client computer 102. For example, the follow-on message controller 120 may send the follow-on command from one client computer 102, across the network 106, to another client computer 102. The follow-on message controller 120 on the other client computer 102 then receives 264 the follow-on command. In some embodiments, the follow-on message controller 120 polls the email repository 104 at a regular interval for a follow-on command related to a received email.

After receiving the follow-on command at the other client computer 102, the follow-on message controller 120 determines 266 if there is an email draft in progress and, if so, interrupts 268 access to the email client 108 of the email draft in progress. For example, when a user is in the middle of drafting an email associated with a follow-on message, the users may temporarily lose access to the email client 108 and, hence, the email draft in progress. A more detailed embodiment of the determine email status operation 266 and the interrupt email client access operation 268 is shown in FIG. 9 and FIG. 10, and described below.

Figure 9:
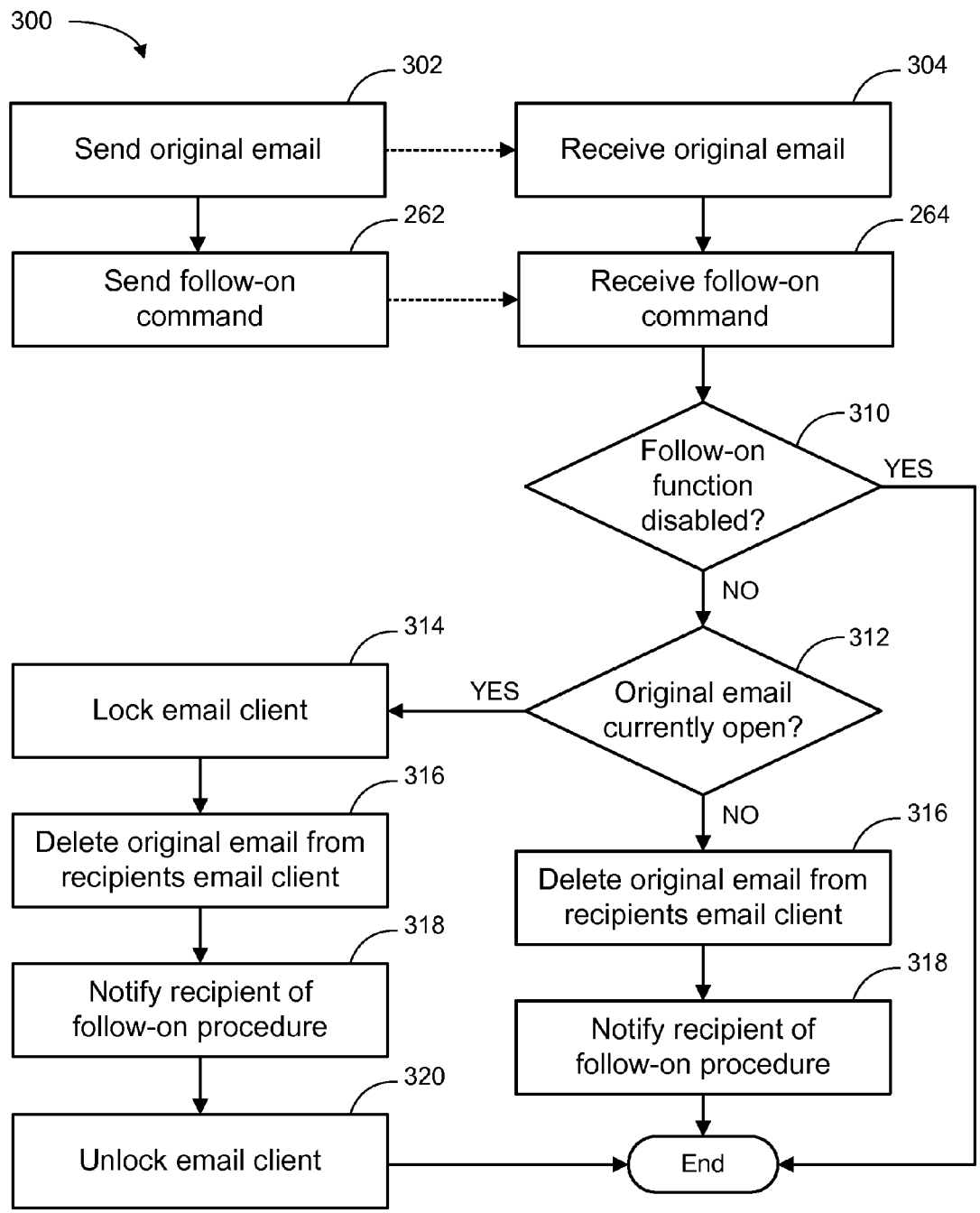
FIG. 9 depicts a schematic flow chart diagram of another embodiment of a follow-on method for use with the follow-on message controller of FIG. 2.
Figure 10:
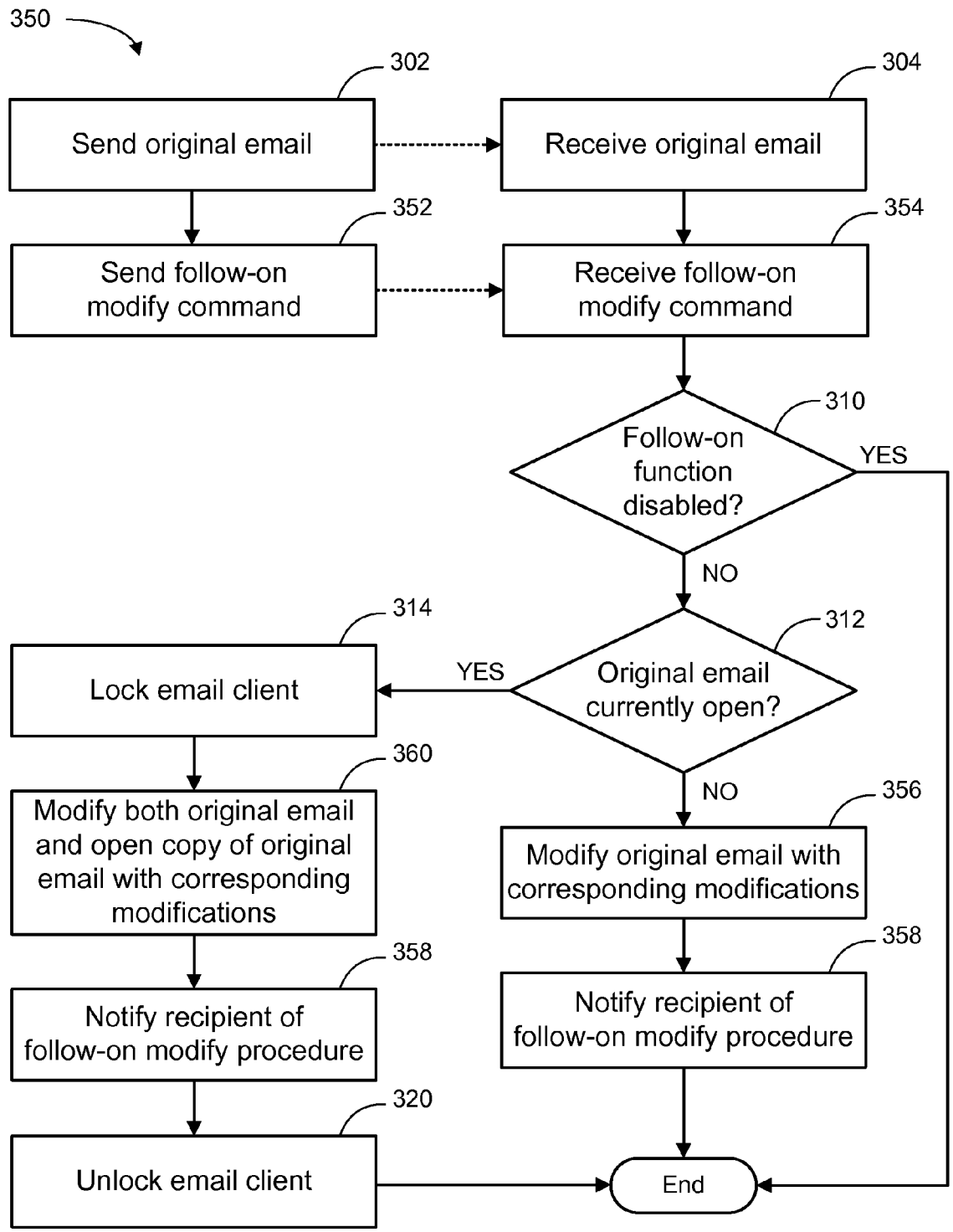
FIG. 10 depicts a schematic flow chart diagram of an embodiment of a follow-on modify method for use with the follow-on message controller of FIG. 2.

FIG. 9 depicts a schematic flow chart diagram of another embodiment of a follow-on method 300 for use with the follow-on message controller 120 of FIG. 2. The follow-on method 300 contains operations similar to the determine email status operation 266 and the interrupt email client access operation 268 of FIG. 8 in a more detailed embodiment. For ease of explanation, the follow-on method 300 is described with reference to the follow-on message controller 120 of FIG. 2. However, some embodiments of the follow-on method 300 may be implemented with other follow-on message controllers. Additionally, the follow-on message method 300 is described in conjunction with the general follow-on method 260 of FIG. 8, but some embodiments of the follow-on method 300 may be implemented with other general follow-on methods.

In the illustrated the follow-on method 300, a user, or sender, composes an original email on the sender email client 108 and sends 302 the original email to another user. The other user, or recipient, then receives 304 the original email in the recipient email client 108. The user may then decide the content of the original email is no longer relevant and can be ignored or deleted, or may discover the recipient of the original email is an unintended recipient. The user then selects and sends 262 an appropriate follow-on command to the email client 108 of the recipient. In one embodiment, the user selects the appropriate follow-on command and the follow-on message controller 120 then initiates the appropriate follow-on command.

After the follow-on command is sent from the sender email client 108, the recipient email client 108 then receives 264 the follow-on command. The follow-on message controller 120 of the recipient email client 108 then executes the received follow-on command to initiate the procedure of the follow-on command. In one embodiment, the evaluation engine 130 determines 310 whether the follow-on function is disabled in the recipient email client 108 and, if so, the procedure of the follow-on command ends. Otherwise, the evaluation engine 130 then determines 312 whether the original email received in the recipient email client 108 is currently open. In some embodiments, the original email is currently open for review. In other embodiments, the original email is currently open as an email draft for replying or forwarding.

If the original email is currently open, then the command engine 132 locks 314 the recipient email client 108 to temporarily disable some or all functionality within the recipient email client 108. In one embodiment, the command engine 132 locks the original email that is currently open, instead of locking the entire recipient email client 108.

The command engine 132 then deletes 316 the original email in the recipient email client 108 as well as the original email that is currently open. For example, as mentioned above, a presently open copy of the received email may be one instance of the received email, and the received email stored in the email repository 108, or stored on the client computer 102, may be another instance of the same email. Thus, the command engine 132 deletes each instance of the received email associated with the delete command. In some embodiments, the delete command 316 may be optional, and may be omitted in a follow-on ignore procedure. In other words, the recipient may be given the option of choosing not to delete the original email, or to continue drafting a reply or forward email of the original email.

Following the operation to delete 316 the original email, the notification engine 134 then notifies 318 the recipient of the follow-on message procedure. In one embodiment, the notification engine 134 sends an instant message to the recipient client computer 102, indicating to the recipient the details and reason of the follow-on message procedure. In some embodiments, the notification operation 318 may be optional, and may be omitted in a follow-on ignore procedure or a follow-on delete procedure. The command engine 132 then unlocks 320 the email client 108, and the email client 108 returns to regular operation. In a further embodiment, the command engine 132 may wait to unlock 320 the email client 108 until the recipient acknowledges the details of the follow-on notification.

Alternatively, if the original email is not currently open, the command engine 132 deletes 316 the original email received in the recipient email client 108, and the notification engine 134 notifies 318 the recipient of the follow-on message procedure. In some embodiments, similar to the optional 316 and 318 operations above, the 316 and 318 operations here are also optional, and may not be executed in a follow-on ignore procedure or a follow-on delete procedure.

For example, after a user composes and sends an original email to a recipient, the user may decide the content of the email is no longer relevant and can be ignored or deleted. In one embodiment, the user selects and initiates the appropriate follow-on command procedure, and the follow-on message controller 120 receives and executes the follow-on command. The evaluation engine 130 then determines whether the follow-on function is enabled in the recipient's email client 108 and, if so, the evaluation engine 130 then determines whether an instance of the original email is currently open. If the original email is currently open, then the command engine 132 temporarily locks functionality of the recipient email client 108 in order to execute a deletion of all instances of the original email in the recipient email client 108, and the notification engine 134 notifies the recipient of the follow-on delete procedure. Alternatively, in the case of an ignore command, the notification engine 134 notifies the user to ignore the original email received in the email client 108. Following the recipient's acknowledgement of the follow-on notification, the command engine 132 then returns full control of the recipient email client 108 back to the recipient.

FIG. 10 depicts a schematic flow chart diagram of an embodiment of a follow-on modify method 350 for use with the follow-on message controller of FIG. 2. Additionally, many of the operations of the illustrated follow-on modify method 350 are substantially similar to the operations of the follow-on method 300 and, hence, are not described further. For ease of explanation, the follow-on modify method 350 is described with reference to the follow-on message controller 120 of FIG. 2. However, some embodiments of the follow-on modify method 350 may be implemented with other follow-on message controllers. Additionally, the follow-on modify method 350 is described in conjunction with the general follow-on method 260 of FIG. 8, but some embodiments of the follow-on modify method 350 may be implemented with other general follow-on methods.

After the recipient receives 304 the original email at the recipient's email client 108, the user may decide to modify information contained in the body of the email, modify one or more attachments, or modify a list of recipients. Modifying an original email may include adding or deleting parts of the original email such as an attachment or unintended recipient, or changing parts of the original email such as information contained in the body of the email or an attachment.

The user then selects and sends 352 a follow-on modify command to the email client 108 of the recipient, and the recipient's email client 108 receives 354 the follow-on modify command. In one embodiment, the user selects the follow-on modify command, and the follow-on message controller 120 of the recipient email client 108 then initiates the follow-on modify procedure.

If the evaluation engine 130 determines 312 the original email received in the recipient email client 108 is not currently open, the command engine 132 modifies 356 the original email received in the recipient email client 108, and the notification engine 134 notifies 358 the recipient of the follow-on modify procedure. In some embodiments, similar to the optional operations above, the notification operation 358 is also optional, and may not be executed in a follow-on modify procedure.

For example, if the sender modifies the body of the original email and one or more attachments, and the list of one or more recipients has not changed, the command engine 132, according to the modifications of the modified version of the original email, makes the appropriate modifications to the original email received in the recipient email client 108 according to the modifications contained in the modified version of the original email.

Thus, instead of showing one original email and a second modified version of the original email in the recipient email client 108, the recipient email client 108 shows a single modified version of the original email. In one embodiment, the command engine 132 modifies the original email received in the recipient email client 108 by adding, deleting and changing parts in the original email, including information in the body of the email and attachments. In another embodiment, the command engine 132 modifies the original email received in the recipient email client 108 by deleting the original email and replacing the original email with a modified version of the original email.

In one embodiment, if the sender modifies the body of the original email and one or more attachments, and the list of one or more recipients does change (e.g., one or more new recipients is added to the list of recipients of the original email), then the modified version of the original email is simply sent to the email client 108 of the newly added recipient and appears as a new email. In another embodiment, if the sender modifies the body of the original email and one or more attachments, and the list of one or more recipients changes (e.g., one or more recipients of the original email is an unintended recipient and so is removed from the list of recipients of the original email), then the original email received in the unintended recipient email client 108 is simply deleted, similar to the follow-on delete procedure described in relation to FIG. 9 above.

If the evaluation engine 130 determines 312 the original email received in the recipient email client 108 is currently open, as explained above in relation to FIG. 9, the command engine 132 temporarily locks 314 functionality of the recipient email client 108. The command engine 132 then modifies 360 each instance of the original email received in the recipient email client 108 which is associated with the modify command according to the modifications made by the sender to the original email. In some embodiments, the original email is currently open for review. In other embodiments, the original email is currently open as an email draft for replying or forwarding. For example, as mentioned above, a presently open copy of the received email may be one instance of the received email, and the received email stored in the email repository 104, or stored on the client computer 102, may be another instance of the same email. Thus, the command engine 132 modifies each instance of the received email associated with the modify command.

Following the operation to modify 360 the original email, the notification engine 134 then notifies 358 the recipient of the follow-on modify procedure. In one embodiment, the notification engine 134 sends an instant message to the recipient client computer 102, indicating to the recipient the details and reason of the follow-on modify procedure. As explained above, the notification operation 358 may be optional, and may be omitted in a follow-on modify procedure. The command engine 132 then unlocks 320 the email client 108, and the email client 108 returns to regular operation. As explained above, the command engine 132 may wait to unlock 320 the email client 108 until the recipient acknowledges the details of the follow-on modify notification.

For example, after a user composes and sends an original email to a recipient, the user may decide to modify information contained in the body of the email, to modify one or more attachments, or to modify a list of recipients. In one embodiment, the user selects and initiates the follow-on modify procedure, and the follow-on message controller 120 receives and executes the modify command. The evaluation engine 130 then determines whether the follow-on function is enabled in the recipient's email client 108 and, if so, the evaluation engine 130 then determines whether an instance of the original email is currently open and, if so, the command engine 132 temporarily locks functionality of the recipient email client 108 in order to modify all instances of the original email in the recipient email client 108, and the notification engine 134 then notifies the recipient of the follow-on modify procedure. Following the recipient's acknowledgement of the follow-on notification, the command engine 132 then returns full control of the recipient email client 108 back to the recipient.

Embodiments of the system and method of the follow-on message process described can have a real and positive impact on improving the functionality of integrated information management applications. For example, some embodiments provide a selective process of executing follow-on messages and notifying recipients of associated follow-on procedures. Additionally, some embodiments facilitate improving productivity and reducing or eliminating wasted time and effort in finding solutions to problems already solved and answering questions already answered.

It should also be noted that at least some of the operations for the method 260, 300, and 350 described herein may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to receive a follow-on command associated with an email received at an email client, an operation to determine whether an email draft is in progress, wherein the email draft in progress is associated with the received email, and an operation to interrupt access to the email client associated with the email draft in progress in response to the follow-on command.

Another embodiment includes an operation to display a visual notification on a display device to announce the interrupted access to the email client. The visual notification may be an instant message, an email, or another type of visual notification. Another embodiment includes an operation to execute the follow-on command in response to a determination that a follow-on function is enabled in the email client. Another embodiment includes an operation to modify a segment of the received email in response to the follow-on command. Another embodiment includes an operation to modify a segment of the email draft in progress in response to the follow-on command. Another embodiment includes an operation to delete the received email in response to the follow-on command. Another embodiment includes an operation to determine a read status of the received email. The read status of the received email may be an unread status, a read status, a currently open status, or another status of the received email.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program that, when executed on a computer, causes the computer to perform operations comprising:

receive a follow-on command associated with an email received at an email client;
determine whether an email draft is in progress, wherein the email draft in progress is associated with the received email; and
interrupt access to the email client associated with the email draft in progress by disabling at least some of the functionality associated with the email client in response to the follow-on command.

2. The computer program product of claim 1, wherein the computer readable program, when executed on the computer, causes the computer to perform operations to display a visual notification on a display device to announce the interrupted access to the email client.

3. The computer program product of claim 2, wherein the visual notification comprises an instant message.

4. The computer program product of claim 2, wherein the visual notification comprises a follow-on notification within a header of the received email.

5. The computer program product of claim 1, wherein the computer readable program, when executed on the computer, causes the computer to perform operations to execute the follow-on command in response to a determination that a follow-on function is enabled in the email client.

6. The computer program product of claim 5, wherein the computer readable program, when executed on the computer, causes the computer to perform operations to enable the email client to modify a segment of the received email in response to the follow-on command.

7. The computer program product of claim 5, wherein the computer readable program, when executed on the computer, causes the computer to perform further operations to enable the email client to modify a segment of the email draft in progress in response to the follow-on command.

8. The computer program product of claim 5, wherein the computer readable program, when executed on the computer, causes the computer to perform operations to delete the received email in response to the follow-on command.

9. The computer program product of claim 5, wherein the computer readable program, when executed on the computer, causes the computer to perform operations to determine a read status of the received email, wherein the read status of the received email comprises one status of a group of statuses consisting of an unread status, a read status, and a currently open status.

10. A follow-on message processing system comprising:
a client computer coupled to a network;
an email client coupled to the client computer, the email client to receive an email and a follow-on command from another email client, wherein the follow-on command is associated with the email received from the other email client;
a follow-on message controller coupled to the email client, the follow-on message controller to interrupt access to the email client by disabling at least some of the functionality associated with the email client in response to a determination that an email draft is in progress, wherein the email draft in progress is associated with the received email.

11. The follow-on message processing system of claim 10, wherein the follow-on message controller comprises a notification engine, the notification engine to display a visual notification on a display device to announce the interrupted access to the email client.

12. The follow-on message processing system of claim 11, wherein the notification engine comprises an IM interface, the IM interface to display an instant message on the display device, wherein the visual notification comprises the instant message.

13. The computer program product of claim 11, wherein the notification engine comprises a network interface, the network interface to display a follow-on notification within a header of the received email.

14. The follow-on message processing system of claim 10, further comprising a command engine to execute the follow-on command in response to a determination that a follow-on function is enabled in the email client.

15. The follow-on message processing system of claim 14, wherein the command engine is further configured to enable the email client to modify a segment of the received email in response to the follow-on command, wherein the follow-on command comprises a modify command.

16. The follow-on message processing system of claim 15, wherein the command engine is further configured to enable the email client to modify a segment of the email draft in progress in response to the follow-on command.

17. The follow-on message processing system of claim 14, wherein the command engine is further configured to delete the received email in response to the follow-on command, wherein the follow-on command comprises a delete command.

18. The follow-on message processing system of claim 10, wherein the follow-on message controller comprises an evaluation engine, the evaluation engine to determine whether a follow-on function is enabled in the email client, to determine a read status of the received email, and to determine whether the email draft is in progress.

19. A follow-on email processing system comprising:
a sender client computer coupled to a network;
a sender email client coupled to the sender client computer, the sender email client to send an original email to one or more recipients;
a sender follow-on message controller coupled to the sender email client, the sender follow-on message controller to send a follow-on command to the one or more recipients, wherein the follow-on command is associated with the original email;
an email repository coupled to the network, the email repository to store the original email;
a receiver client computer coupled to the network;
a receiver email client coupled to the receiver client computer, the receiver email client to receive the original email and the follow-on command from the sender email client;
a receiver follow-on message controller coupled to the receiver email client, the receiver follow-on message controller to interrupt user access to the receiver email client by disabling at least some of the functionality associated with the receiver email client in response to the follow-on command and a determination that an email draft is in progress, wherein the email draft in progress is associated with the original email from the sender email client; and
a receiver display device coupled to the receiver client computer, the receiver display device to display a follow-on notification to communicate the interrupted user access to a user.

20. The follow-on email processing system of claim 19, wherein the receiver follow-on message controller comprises a notification engine, the notification engine to generate the follow-on notification for display on the receiver display device, wherein the follow-on notification comprises an instant message.

21. A method for implementing a follow-on message, the method comprising:
receiving a follow-on command associated with an email received at an email client implemented on a client computer;
determining whether an email draft is in progress, wherein the email draft in progress is associated with the received email; and
disabling at least some of the functionality associated with the email draft in progress to interrupt access to the email draft in progress in response to receiving the follow-on command.

22. The method of claim 21, further comprising:
determining whether a follow-on function is enabled in the email client;
determining whether a copy of the received email is currently open;
locking the copy of the received email to interrupt user access to the copy of the received email;
modifying the copy of the received email according to the follow-on command, wherein the follow-on command comprises a modify command;
notifying a user of the follow-on command; and
unlocking the modified copy of the received email.

23. The method of claim 21, wherein notifying the user of the follow-on command further comprises displaying a visual notification on a display device to notify the user of the follow-on command, wherein the visual notification comprises an instant message.

24. The computer program product of claim 1, wherein the computer readable program, when executed on the computer, causes the computer to perform operations to interrupt access to the email draft in progress by disabling at least some of the functionality associated with the email draft in progress in response to the follow-on command.

25. The follow-on message processing system of claim 10, wherein the follow-on message controller is further configured to interrupt access to the email draft in progress by disabling at least some of the functionality associated with the email draft in progress in response to the follow-on command.

* * * * *